SPREADING IMPLEMENTS

Filed May 18, 1967 9 Sheets-Sheet 1

INVENTORS
Cornelis van der Lely
Hendricus Jacobus Cornelis Nieuwenhoven
BY
Mason, Mason & Albright
Attorneys

INVENTORS

CORNELIS VAN DER LELY

HENDRICUS JACOBUS CORNELIS NIEUWENHOVEN

BY

Mason, Mason & Albright

Attorneys

SPREADING IMPLEMENTS

Filed May 18, 1967

INVENTORS
Cornelis van der Lely
Hendricus Jacobus Cornelis Nieuwenhoven
BY
Mason, Mason & Albright
Attorneys INVENTORS
CORNELIS VAN DER LELY
HENDRICUS JACOBUS CORNELIS NIEUWENHOVEN
BY
Mason, Mason & Albright
Attorneys March 17, 1970 C. VAN DER LELY ET AL 3,501,132

SPREADING IMPLEMENTS

Filed May 18, 1967 9 Sheets-Sheet 5

INVENTORS
CORNELIS VAN DER LELY
HENDRICUS JACOBUS CORNELIS NIEUWENHOVEN
BY
Mason, Mason & Albright
Attorneys March 17, 1970 C. VAN DER LELY ET AL 3,501,132

SPREADING IMPLEMENTS

Filed May 18, 1967 9 Sheets-Sheet 6

INVENTORS
CORNELIS VAN DER LELY
HENDRICUS JACOBUS CORNELIS NIEUWENHOVEN
BY
Mason, Mason & Albright
Attorneys INVENTORS
CORNELIS VAN DER LELY
HENDRICUS JACOBUS CORNELIS NIEUWENHOVEN
BY
Mason, Mason & Albright
Attorneys

SPREADING IMPLEMENTS

Filed May 18, 1967

INVENTORS
CORNELIS VAN DER LELY
HENDRICUS JACOBUS CORNELIS NIEUWENHOVEN
BY
Mason, Mason & Albright
Attorneys March 17, 1970 C. VAN DER LELY ET AL 3,501,132

SPREADING IMPLEMENTS

Filed May 18, 1967 9 Sheets-Sheet 9

CORNELIS VAN DER LELY INVENTORS
HENDRICUS JACOBUS CORNELIS NIEUWENHOVEN
BY
Mason, Mason & Albright
Attorneys United States Patent Office 3,501,132

Patented Mar. 17, 1970

3,501,132

SPREADING IMPLEMENTS

Cornelis van der Lely, Bruschenrain 7, Zug, Switzerland, and Hendricus Jacobus Cornelis Nieuwenhoven, Baar, Switzerland Filed May 18, 1967, Ser. No. 639,428
Claims priority, application Netherlands, June 3, 1966, 6607702; Dec. 28, 1966, 6618232
Int. Cl. B01s *7/08, 11/00;* F16h *35/08*
U.S. Cl. 259—101 27 Claims

ABSTRACT OF THE DISCLOSURE

A spreading implement includes a hopper with a turnable agitator in the hopper which is driven by a rotary shaft. Driving mechanism including eccentric devices connects the rotary shaft to the agitator through a plurality of interconnecting rods. By varying the relative positions of one or more of the interconnecting rods, the speed and extent of rotation of the agitator responsive to the revolutions of the rotary shaft are adjustable.

An object of the invention is to provide spreading implements of this kind in which the motion of the agitator can be readily adjusted to suit different conditions.

According to the invention, there is provided a spreading implement of the kind set forth, wherein the driving mechanism includes a crank or eccentric coupled with the rotary shaft and a plurality of interconnected rods and/or arms and/or levers or the like movably interposed between the rotary shaft and the agitator in such a way that at least one of them can be adjusted to vary the extent of the movement of the agitator which will be caused in response to a single revolution of said rotary shaft.

Figure 1:
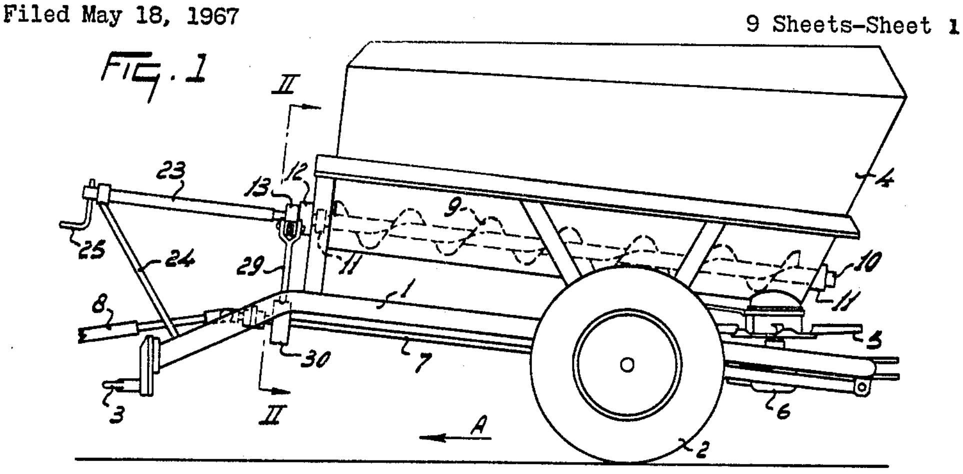
Figure 2:
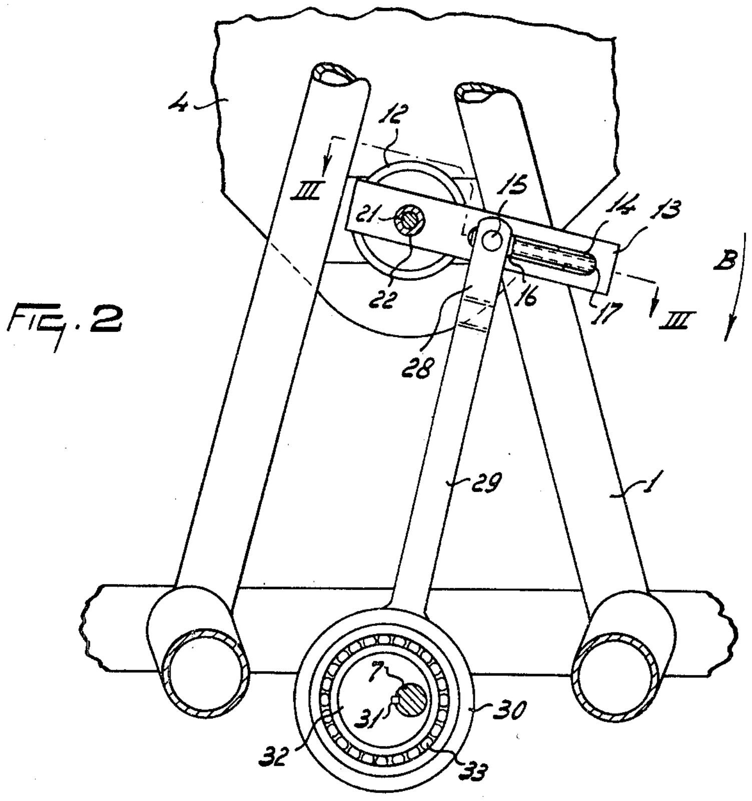
Figure 3:
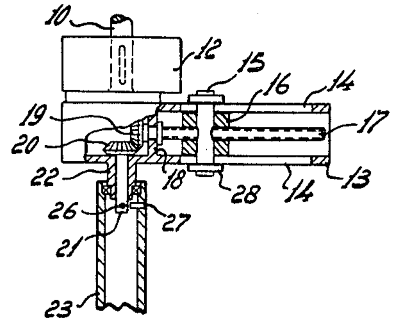
Figure 4:
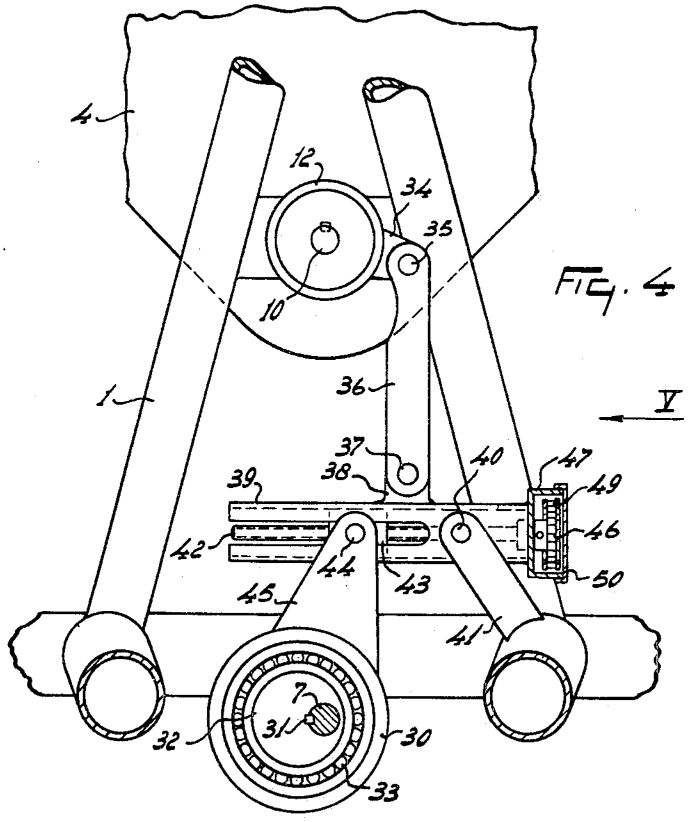
Figure 5:
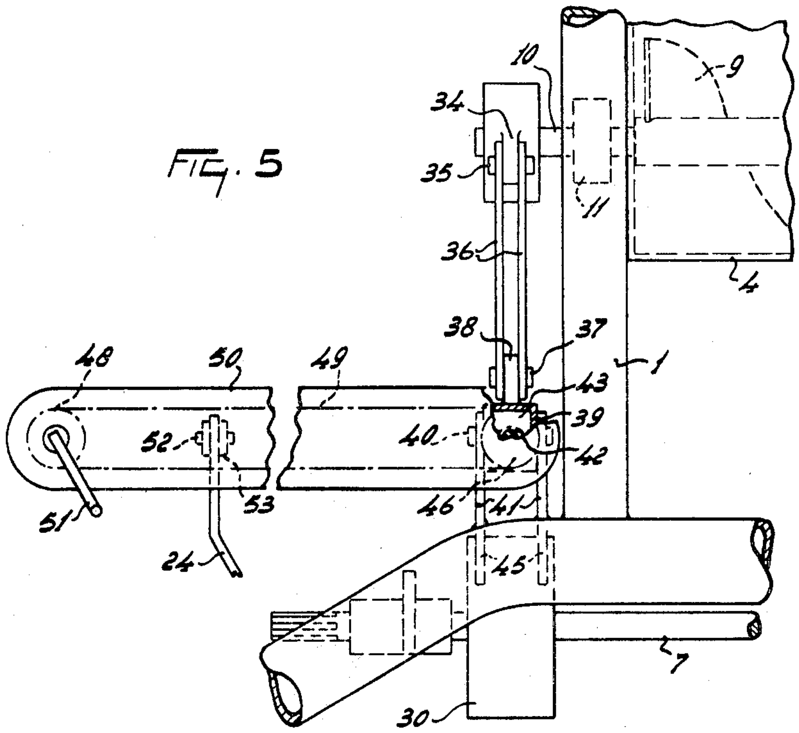
Figure 6:
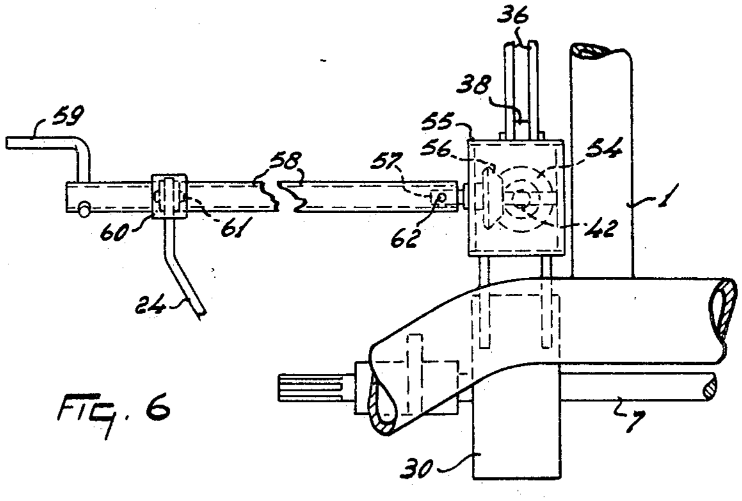
Figure 7:
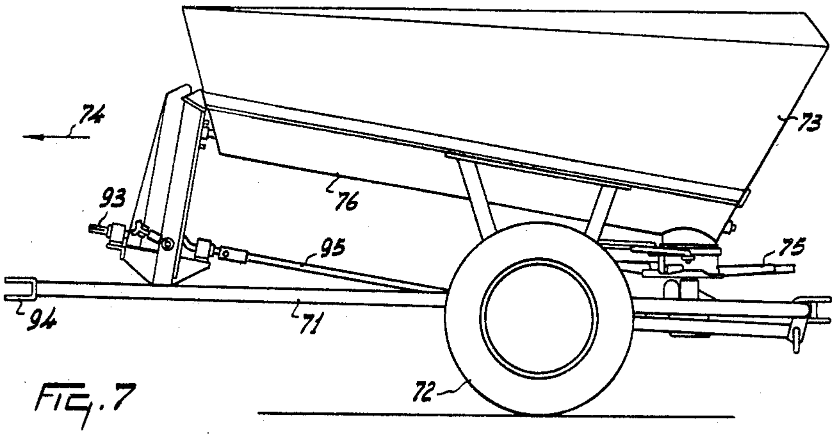
Figure 10:
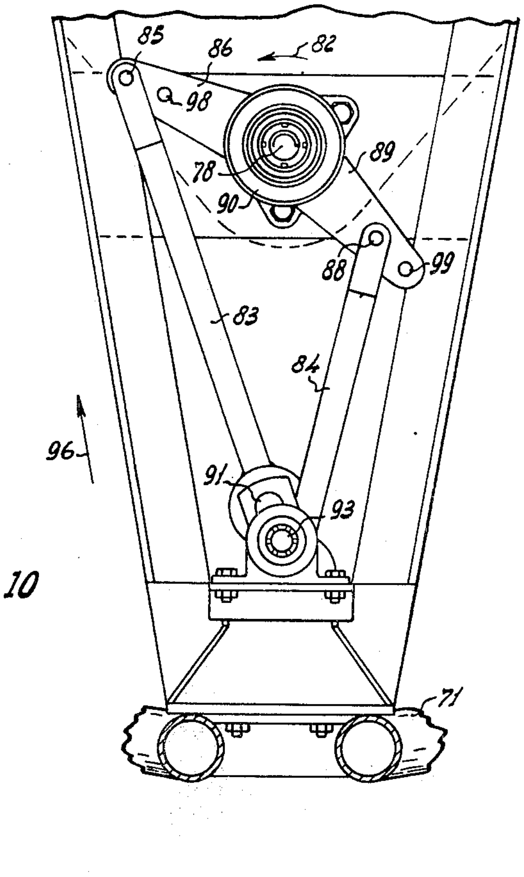
Figure 8:
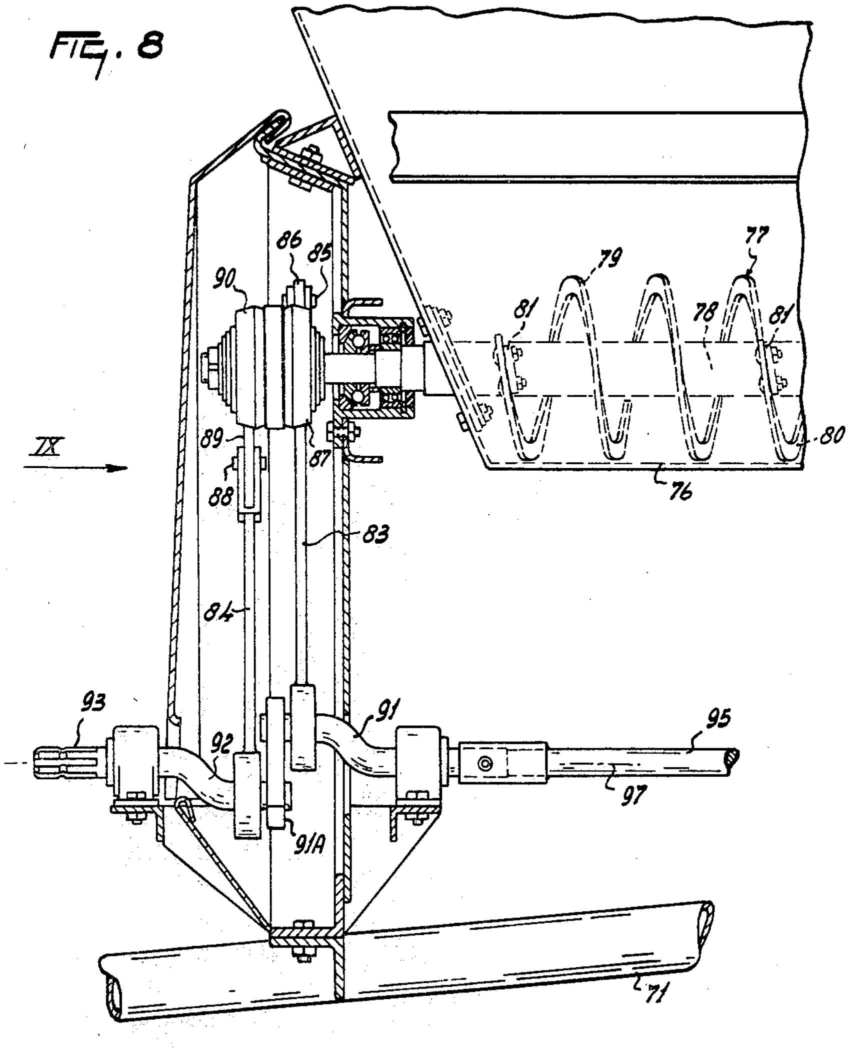
Figure 9:
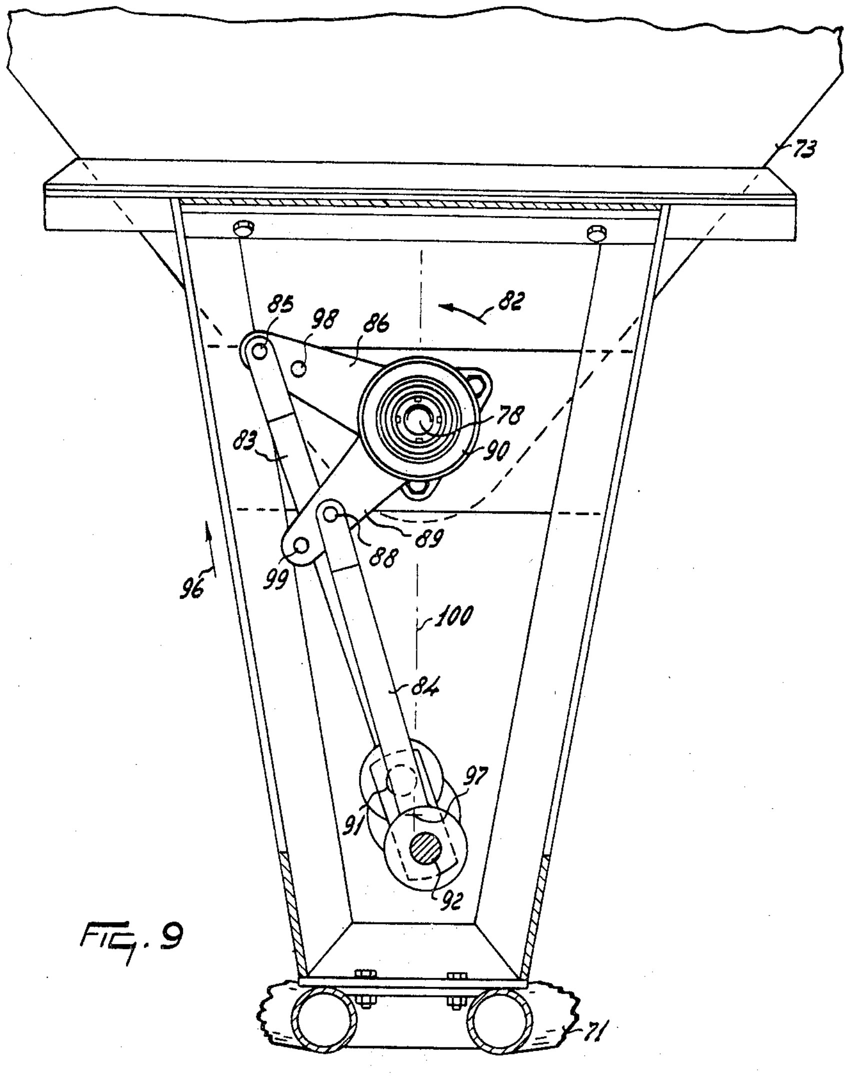
Figure 11:
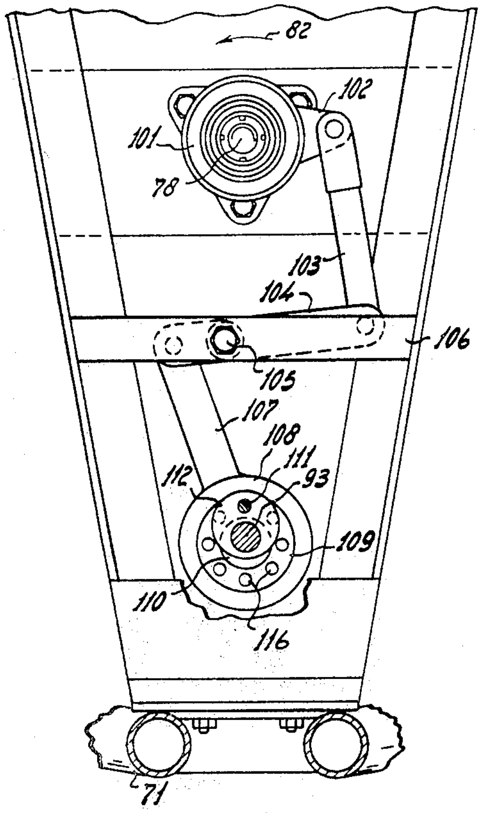
Figure 12:
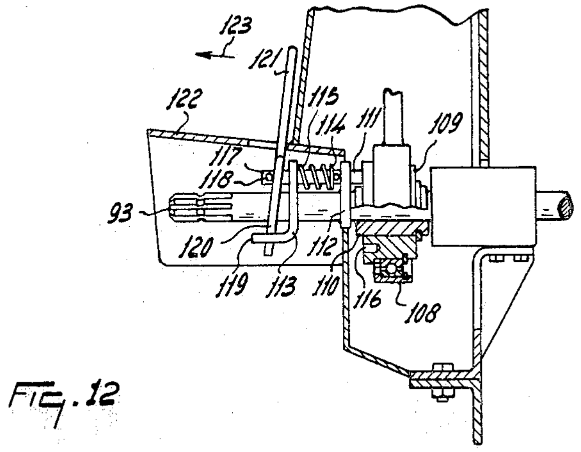

For a better understanding of the invention, and to show how the same may be carried into effect, reference will now be made, by way of example, to the accompanying drawings, in which:

FIGURE 1 is a side elevation of a spreading implement in accordance with the invention, FIGURE 2 is a section, to an enlarged scale, taken on the line II–II of FIGURE 1, FIGURE 3 is a part-sectional view as seen along the line III–III in FIGURE 2, FIGURE 4 corresponds to FIGURE 2 but shows an alternative construction, FIGURE 5 is an elevation as seen in the direction indicated by the arrow V of FIGURE 4, FIGURE 6 corresponds to FIGURE 5 but shows another alternative construction, FIGURE 7 is a side elevation of an alternative form of spreading implement in accordance with the invention, FIGURE 8 is a sectional view, to an enlarged scale, of a leading part of the implement of FIGURE 7, said section being taken in a vertical plane of approximate symmetry of the implement extending parallel to its intended direction of operative travel, FIGURE 9 is a front elevation as seen in the direction indicated by the arrow IX in FIGURE 8, FIGURE 10 corresponds to FIGURE 9 but shows parts in different positions to those illustrated in the preceding figure, FIGURE 11 corresponds to FIGURE 9 but shows an alternative construction, FIGURE 12 is a vertical section corresponding to a lower region of FIGURE 11, and FIGURES 13, 14 and 15 all correspond to FIGURE 9 but show three further alternative constructions in accordance with the invention.

Referring to the drawings, the spreading implement which is illustrated in FIGURE 1 is intended for the distribution over the ground of powdered or granular materials such as, for example, granular artificial fertilisers, sand, lime, seeds and the like. The implement has a frame 1 which is supported upon the ground by a pair of ground wheels 2. The leading end of the frame 1 is provided with a draw hook 3 adapted to be connected to, for example, the tow bar of an agricultural tractor or other towing vehicle. The frame 1 supports a container or hopper 4 for the material which is to be spread, said hopper being in communication with a rotary distributor or spreading member 5 that is located towards the rear of the implement. The distributor 5 is arranged to be driven from an underlying gear box or gear casing 6 which is secured to the frame 1. The gear box or gear casing 6 has a rotary input shaft 7 that extends forwardly therefrom and whose leading end is connected to a telescopic transmission shaft 8 by a universal joint, the shaft 8 being employed to place the shaft 7 in driven communication with the power take-off shaft of the tractor or other towing vehicle to which the draw hook 3 is connected during use of the implement. The hopper 4 accommodates an archimedean screw or worm 9 which serves as both an agitator and a conveyor for the material which is contained within the hopper 4 during the use of the implement. The screw or worm 9 has aligned stub shafts 10 at its opposite ends, these stub shafts being rotatable in bearings 11 carried by the front and rear walls of the hopper 4. During use of the implement, the screw or worm 9 is caused to rotate about its longitudinal axis in such a way that it urges material within the hopper 4 rearwardly towards a downwardly directed outlet which is in communication with the rotary distributor or spreading member 5.

The leading end of the foremost stub shaft 10 carries a ratchet wheel (not visible) which is surrounded by a casing 12 that carries, internally, a pawl (also not visible) arranged to co-operate with said ratchet wheel. The arrangement is such that, upon the casing being turned in the direction indicated by the arrow B in FIGURE 2 of the drawings, the pawl and ratchet wheel will co-operate to drive the screw or worm 9 in the same direction whereas turning motion of the casing 12 in a direction opposite to the direction B will be lost motion having no effect upon the screw or worm 9.

The casing 12 carries a hollow arm 13 which is of square cross-section. Two relatively oposite walls of the arm 13 are formed with longitudinally extending slots 14 through which a transverse pin 15 is entered so as to extend parallel to the stub shafts 10. The pin 15 passes through a hole in a block 16 located within the arm 13, said block 16 and pin 15 also being formed with aligned holes through which a spindle 17 is entered. The spindle 17 extends perpendicular to the pin 15 and is formed with a screwthread adapted to co-operate with a mating screwthread formed in the holes in the block 16 in which the spindle 17 is entered. One end of the spindle 17 is rotatably mounted in a transverse support 18 (FIGURE 3) disposed internally of the arm 13. The arrangement is such that the spindle 17 is rotatable relative to the support 18 but is not displaceable axially relative thereto to any appreciable extent.

The end of the spindle 17 which is entered through the support 18 and which is disposed adjacent to that support carries a bevel pinion 19 whose teeth are in mesh with those of a bevel pinion 20 carried at one end of a rotary adjusting shaft 21 that is journalled in a bearing 22 integral with, or rigidly secured to, the arm 13 so as to extend perpendicular to the spindle 17. A tube 23 in axial alignment with the shaft 21 is supported at one end by the exterior of the bearing 22 and at its opposite leading end by a support 24 (FIGURE 1) that projects upwardly and forwardly from the frame 1. A manually operable crank 25 is mounted at the leading end of the tube 23 to enable said tube to be rotated about its own longitudinal axis. The end of the shaft 21 that is remote from the bevel pinion 22 and which is located internally of the tube 23 has a transverse pin 26 entered therethrough. The tube 23 carries a radially inwardly projecting pin 27, the pin 27 being contained in the same plane (perpendicular to the longitudinal axis of the shaft 21) as the pin 26.

The ends of the pin 15 that project outwardly from the slots 14 are entered through aligned holes formed in the limbs of a forked bracket 28, said limbs lying at relatively opposite sides of the arm 13. The bracket 28 is mounted at the upper end of a connecting rod 29 the lower end of which is integral with, or rigidly secured to, a ring 30. A circular eccentric 32 is secured to the input shaft 7 with the aid of a key 31 in such a way that the plane of the eccentric 32 is perpendicular to the longitudinal axis of the shaft 7. The ring 30 surrounds the eccentric 32 and a ball bearing 33 lies between said ring and said eccentric.

In the use of the spreading implement which has been described, the draw hook 3 is connected to the tow bar of an agricultural tractor or other towing vehicle and the transmission shaft 8 is employed to place the input shaft 7 in driven communication with the power take-off shaft of the same tractor or other vehicle. Upon towing the implement over the ground in the direction A (FIGURE 1) the rotary distributor or spreading member 5 can be rotated about a substantially vertical axis by input shaft 7 to spread material from the hopper 4 over a strip of ground of considerable width. The rotary distributor or spreading member 5 will, in practice, be provided with means to control the rate of delivery per unit time of material and also with means to control the location of the strip of ground upon which the material is spread relative to the path of travel of the implement. Since such means do not form the subject of the present invention, no details of them are shown in the drawings. As the eccentric 32 is rotated by the shaft 7, the ring 30 follows its movement and causes the connecting rod 29 to perform an upwardly and downwardly directed reciprocatory motion. This movement, in turn, causes the arm 13 to oscillate about the axis of the aligned stub shafts 10 and it will be evident from the preceding description that the oscillatory motion of the arm 13 is translated into uni-directional rotation of the screw or worm 9 in the direction B which is shown in FIGURE 2 of the drawings.

The crank 25 is readily accessible from the driving seat of the tractor or other vehicle which is towing the implement and said crank can be employed to rotate the tube 23 thus causing the pin 27 to come into driving engagement with the pin 26. It will be evident from FIGURE 3 of the drawings that rotation of the adjusting shaft 21 by the tube 23 will cause the block 16 and pin 15 to be moved longitudinally of the arm 13 in a direction corresponding to the direction in which the crank 25 is rotated. Thus, the perpendicular distance between the axis of the stub shafts 10 and the point at which the reciprocatory motion of the connecting rod 29 is applied to the arm 13 (i.e. the position of the pin 15) will be changed. Since the reciprocatory motion of the connecting rod 29 remains unaltered, the effect of such adjustment is to increase, or decrease, the amplitude of oscillation of the arm 13 about the axis of the stub shafts 10 so that the angular displacement of the screw or worm 9 about its own longitudinal axis in the direction B in response to one complete rotation of the input shaft 7 will be either increased or decreased. The arrangement which has been described provides continuously variable adjustability of the degree of angular displacement of the screw or worm 9 in response to one rotation of the input shaft 7 between a predetermined maximum (corresponding to the pin 15 being at left-hand ends of the slots 15 as seen in FIGURE 2 of the drawings) and a predetermined minimum (corresponding to the pin 15 being at the right-hand ends of the slots 14 as seen in FIGURE 2 of the drawings). The lost motion connection between the tube 23 and the rotary adjusting shaft by way of the pins 26 and 27 ensures that, during normal operation of the implement, the oscillating pin 26 will not contact the pin 27 and cause undesired adjustment to take place or unnecessary motion of the tube 23 and crank 25.

FIGURES 4 and 5 of the drawings illustrate an alternative construction of the adjustable driving mechanism for the screw or worm 9. Those parts which are similar, or identical, to parts which have already been described are designated by the same reference numerals as are used in FIGURES 1 to 3 of the drawings. In this case, the casing 12 carries a projecting lug 34 to opposite sides of which the upper ends of a pair of connecting rods 36 are pivotally connected by a pin 35 that extends parallel to the stub shafts 10. The lower ends of the connecting rods 36 are similarly connected, with the aid of a relatively parallel pivot pin 37, to the opposite sides of a lug 38 mounted on the upper surface of a hollow arm 39 approximately midway along the length of that arm. A pair of relatively spaced supports 41 project upwardly from part of the frame and the arm 39 is pivotally connected to their upper ends by way of a pair of trunnion pins 40 that extend parallel to the pins 35 and 37. A screw spindle 42 is supported internally of the arm 39 so as to extend axially thereof, the form of support being such that said spindle can rotate about its own longitudinal axis but not move axially to any appreciable extent. As can be seen in FIGURE 4 of the drawings, the arm 39 contains a slidable block 43 provided with oppositely directed pins 44 which project through slots 39A in opposite sides of the arm. A pair of arms 45 project from the previously described ring 30 and their free ends are pivotally engaged with the respective pins 44. The ring 30 and arms 45 together afford a driving member.

A sprocket 46 is fastened to one end of the screw spindle 42, said sprocket being accommodated in one end of a chain casing 47 which is closed by a cover 50 that resiliently engages the lip of the casing 47. The casing 47 projects forwardly, in a similar manner to the previously described tube 23, and is engaged by the support 24, towards its leading end, with the aid of a pair of lugs 53 and a transverse pin 52, the lugs 53 being rigidly secured to the casing 47. The leading end of the casing 47 supports a stub shaft upon which a sprocket 48 is mounted, said stub shaft extending parallel to the spindle 42 and being arranged to be rotated by a manually operable crank 51 which projects through the cover 50. An endless transmission chain 49 drivingly interconnects the sprocket 48 and the sprocket 46.

In the use of a spreading implement of the general kind shown in FIGURE 1 when provided with mechanism as illustrated in FIGURES 4 and 5, the crank 51 will be within reach of the driver of the towing tractor or other vehicle. Rotation of the input shaft 7 will cause the arms 45 to reciprocate upwardly and downwardly thus oscillating the arm 39 about the axis afforded by the trunnion pins 40. This oscillatory motion is transmitted to the casing 12 by reciprocatory motion of the connecting rods 36. Rotation of the crank 51 will cause the block 43 and pins 44 to be moved lengthwise of the arm 39 in a direction corresponding to the direction of rotation of the crank. The distance between the pins 44 and the pins 40 will thus be altered so as to increase, or decrease, the amplitude of oscillation of the arm 39 about the pins 40. The amplitude of oscillation of the casing 12 about the axis of the stub shaft 10 will be similarly varied.

The degree of reciprocation of the arms 45 remains approximately constant as does the distance between the shaft 7 and the pins 40 so that it is the perpendicular distance between the pins 40 and the pins 44 which determines the degree of angular displacement of the screw or worm 9 about its longitudinal axis in response to a single rotation of the input shaft 7. It will be apparent from FIGURE 4 of the drawings that, when required, the pins 44 can be brought very close to the pins 40 so that the screw or worm 9 will be rotated quite rapidly. The pins 44 can also be brought to the ends of the slots 39A remote from the pins 40 so that the screw or worm 9 will then be rotated very slowly.

The construction shown in FIGURE 6 is very similar to that shown in FIGURES 4 and 5 but, in this case, the sprocket 46 is replaced by a bevel pinion 54 secured to the end of the screw spindle 42. The pinion 54 is located within a gear box or casing 55 which also contains a second bevel pinion 56 whose teeth are in mesh with those of the pinion 54. The pinion 56 is mounted on a shaft 57 that extends perpendicular to the spindle 42 and whose end projects forwardly of the implement from the box or casing 55. The leading end of the shaft 47 is provided with a transverse pin 62 and is surrounded by a tube 58 generally similar to the previously described tube 23. The tube 58 is provided with a manually operable crank 59 and is adapted to drive the shaft 57 through a lost motion connection similar, or identical, to that which has already been described with reference to FIGURE 3 of the drawings. The tube 58 is surrounded, near the crank 59, by a sleeve 60 which sleeve is connected to the leading end of the support 24 by a pair of lugs and a pin 61 that is parallel to the axis afforded by the pins 40. Rotation of the tube 58 with the aid of the crank 59 rotates the shaft 57 after the lost motion has been taken up and this rotation is translated into movement of the block 43 lengthwise of the arm 39.

In the embodiments which have so far been described, a one-way mechanism in the form of a pawl and ratchet wheel is employed to translate oscillatory motion of the casing 12 into uni-directional rotation of the screw or worm 9. However, it will be apparent that one-way mechanisms of other kinds may be employed for this purpose such as, for example, one-way sprag clutches and one-way locking ball clutches of various kinds.

FIGURES 7 to 10 of the drawings illustrate a spreading implement having a frame 71 supported by ground wheels 72 and carrying a container or hopper 73 arranged to supply a rotary distributor or spreading member 75 which is located near the rear of the implement relative to its intended direction of operative travel which is indicated by an arrow 74 in FIGURE 7 of the drawings. The hopper 73 is of elongated construction, its length extending substantially parallel to the direction 74. Material from the hopper 73 reaches the rotary distributor or spreading member 75 through one or more outlet ports (not visible) formed in an outlet portion as the lowermost end of the downwardly and rearwardly inclined bottom 76 of the hopper. As in the case of the spreading implement which is shown in FIGURE 1 of the drawings, the implement illustrated in FIGURE 7 is provided with means for controlling the volume of material per unit time which is spread by the rotary distributor 75 and also with means for controlling the position of the strip of land upon which the material falls relative to the path of travel of the implement. These means are not shown in detail since they do not form the subject of the present invention. A combined conveyor and agitator which is generally indicated by the reference numeral 77 (FIGURE 8) extends internally of the hopper 73 immediately above its bottom 76. The combined conveyor and agitator (which will hereinafter be referred to simply as "the agitator" for the sake of brevity) 77 is arranged to tend to displace material rearwardly of the hopper 73 towards its aforementioned outlet portion. It comprises a central rotary shaft 78 and a plurality of helical or spiral members that are arranged concentrically around the shaft 78, FIGURE 8 of the drawings showing a first member 79 and a second member 80 which is connected thereto. The members 79 and 80 are in spaced relationship with the shaft 78 and are connected thereto by strips 81 which project from the shaft 78 at intervals therealong. The members 79 and 80 are arranged in such a way that, upon rotation of the shaft 78 in the direction indicated by the arrow 82 in FIGURE 9 of the drawings, they will tend to urge material in the hopper 73 with which they are in contact rearwardly along its bottom 76 towards the outlet portion of the hopper.

The shaft 78 is arranged to be rotated by driving means which includes two connecting rods 83 and 84. The upper end of the connecting rod 83 is pivotally connected by a pin 85 to the free end of an arm 86 which projects laterally from the outer driving member 87 of a one-way mechanism which may be similar to one of those which has already been described in connection with the earlier embodiments. The inner driven member of the one-way mechanism is connected to the leading end of the shaft 78. The upper end of the coupling rod 84 is similarly connected by a pivot pin 88 to the free end of an arm 89 projecting from the outer driving member 90 of a second one-way mechanism whose inner driven member is also connected to the leading end of the shaft 78. The lowermost end of the connecting rod 83 is rotatably mounted on a crank 91 and the lowermost end of the connecting rod 84 is rotatably mounted on another crank 92, the cranks 91 and 92 being rigidly interconnected by a web in the form of a plate 91A. The crank assembly which has just been described is supported in suitably aligned bearings and includes a forwardly projecting splined input portion 93. The rear end of the crank assembly is connected to an input shaft 95 whose axis 97 is coincident with that of the input portion 93.

In the use of the spreading implement which is illustrated in FIGURES 7 to 10 of the drawings, a coupling member 94 located at the leading end of the frame 71 is connected to the tow bar of an agricultural tractor or other towing vehicle and the implement is drawn over the ground in the direction 74. The input portion 93 of the crank assembly is placed in driven connection with the power take-off shaft of the same tractor or other vehicle in known manner with the aid of an intermediate transmission shaft similar to the telescopic shaft 8 which has previously been mentioned. The rotary distributor or spreading member 75 is rotated about a substantially vertical axis by the drive transmitted to it from the input shaft 95 by way of a gear box or gear casing which is not shown in detail but which may be similar to the previously described box or casing 6. Material within the hopper 73 is urged towards the outlet portion thereof by the agitator 77, said agitator being rotated in the direction 82 by the driving mechanism which includes the connecting rods 83 and 84. The helical or spiral members 79 and 80 are of strip-shaped rectangular cross-section and are so disposed that their flat sides, rather than their edges, will be presented to the material to push it towards the outlet portion of the hopper 73.

The two one-way mechanisms mounted on the leading end of the shaft 78 translate the oscillatory motions of the arms 86 and 89 into uni-directional rotation of the agitator 77. It will be apparent that the two one-way mechanisms both work in a similar manner to that which has previously been described in respect of the foregoing embodiments but it will be noted that the two cranks 91 and 92 are relatively rotated through 180° about the axis 97 so that, as one of the arms 86 and 89 is moving in the direction 82, the other one will be moving in the opposite direction and vice versa. The effect of this is that, in practice, the rotation of the agitator 77 is substantially uninterrupted in the direction 82 since, at any given instant, one one-way mechanism will be effective while the other one will be ineffective. The pressure exerted by the agitator 77 upon the material within the hopper 73 therefore remains more or less constant. The effect of the agitator 77 depends upon its speed of rotation in the direction 82 and this speed of rotation depends, in turn, upon the amplitude of oscillation of the two arms 86 and 89. In order to enable an alteration in the speed of rotation of the agitator 77 to be achieved, the arms 86 and 89 are provided with alternative holes 98 and 99 through which the pins 85 and 88 may be entered to connect the rods 83 and 84 to said arms. The speed of rotation may also be varied by disconnecting, for example, the rod 84 from the arm 89 by withdrawing the pin 88 and subsequently turning the arm 89 from the position shown in FIGURE 9 of the drawings to that shown in FIGURE 10 of the drawings in which said arm is located at the opposite side of a vertical plane 100 of approximate symmetry of the implement extending in the direction 74. The rod 84 is turned appropriately about the crank 92 after the adjustment of the arm 89 and is re-connected to said arm with the aid of the pin 88. In the position shown in FIGURE 10, both of the arms 86 and 89 will be moving in the direction 82 at the same time and in the relatively opposite direction 96 at the same time so that the two one-way mechanisms will no longer work alternately but will be alternately effective and ineffective throughout substantially the same periods of time. Thus, the effective speed of rotation of the agitator 77 will be reduced to about half the speed which it has when the arrangement of FIGURE 9 is employed. It will be apparent that by use of the different holes in the two arms 86 and 89 and by turning said arms to one or other side of the plane 100, a number of different magnitudes of angular displacement of the agitator 77 in the direction 82 can be produced in respect of a single rotation of the input shaft 95.

In the embodiment which has just been described, the agitator 77 is constructed to act also as a conveyor tending to push material within the hopper 73 towards its outlet portion that is located immediately above the rotary distributor or spreading member 75. However, the agitator 77 may be constructed so that it does not have a conveying function but is merely adapted to loosen the material within the hopper and crumble or break up the lumps of that material which may exist. It should also be noted that it is not essential for an implement in accordance with the invention to have ground wheels. The driving mechanism for the agitator may be employed with equal facility in a spreading implement adapted to be supported for travel over the ground by the three-point lifting device or hitch of an agricultural tractor or other operating vehicle. It may be noted that, in the embodiment which has been described with reference to FIGURES 7 to 10 of the drawings, another way of reducing the speed of rotation of the agitator 77 by approximately 50 percent is to disconnect one or the other of the connecting rods 83 and 84 from the corresponding crank and arm so that only the remaining connecting rod will be effective. The disengaged connecting rod may be secured to the frame 71 at some convenient point. If desired, only the crank end of the selected rod need be disengaged and connected to an appropriate point on the frame or casing of the driving mechanism since the corresponding arm will not tend to be moved unless the agitator is incorrectly rotated in the wrong direction.

FIGURES 11 and 12 show an alternative arrangement to that which is illustrated in FIGURES 8, 9 and 10. In this embodiment, the shaft 78 is provided with a one-way mechanism 101 whose driving member has a projecting arm or lug 102 the free end of which is pivotally connected to the upper end of a rod 103. The lower end of the rod 103 is pivoted to one end of a lever 104 turnable about a fulcrum bolt 105 that is rigidly supported by a transverse beam 106. The end of the lever 104 remote from the rod 103 is connected to the upper end of a rod 107 whose lower end is integral with, or rigidly secured to, a ring 108. The ring 108 surrounds an eccentric 109 but the eccentric 109 is itself adjustably connected to an eccentric disc 110. The eccentric disc 110 is rigidly secured to the input portion 93, which, in this embodiment, is an integral portion of the input shaft.

The eccentric 109 and eccentric disc 110 can be turned with respect to one another and retained in chosen relative settings with the aid of a locking pin 111. The locking pin 111 is axially displaceable in holes in two supports 112 and 113 that are arranged around the input shaft 93. The locking pin 111 is urged towards the right as seen in FIGURE 12 of the drawings by a helical compression spring 115 which is wound around it and which bears between the support 113 and a ring 114 immovably mounted (in one direction) upon the locking pin. The spring 115 tends to maintain the locking pin 111 in one of a number of holes 116 that are formed in the eccentric 109. The end 117 of the pin 111 which is remote from the eccentric 109 is provided with a pair of pins 118 which project radially therefrom in relatively opposite directions. The lowermost end of the support 113 takes the form of a holder 119 for the downwardly directed limbs of a fork 120. The limbs of the fork 120 are so shaped that they can lie at relatively opposite sides of the input shaft 93 but will cooperate abuttingly with the two pins 118. The upwardly directed base of the fork 120 takes the form of a handle 121. When required, the fork 120 can be completely disengaged from the holder 119 and the pins 118.

When the spreading implement is in use, the crank 109 and crank disc 110 will cause the connecting rod 107 to reciprocate upwardly and this reciprocation will be translated by the lever 104 and the rod 103 into oscillatory motion of the driving member of the one-way mechanism 101. As can be seen in FIGURE 11 of the drawings the position of the fulcrum bolt 106 is such that there will be some amplification of the reciprocatory motion of the connecting rod 107. The one-way mechanism 101 will, in a similar manner to the preceding embodiments, translate the oscillatory motion which it receives into unidirectional rotation of the shaft 78 in the direction 82. The magnitude of the angular displacement of the shaft 78 in the direction 82 as a result of a single rotation of the input shaft 93 will be dependent upon the extent of reciprocation of the rod 107 which, in turn, is dependent upon the relative settings of the eccentric 109 and eccentric disc 110. The eccentricity of the ring 108, which surrounds the eccentric 109, with respect to the axis of the input shaft 93 can be adjusted by turning the eccentric 109 and disc 110 relative to one another. The number of holes 116 in the eccentric 109 determines the number of different settings of adjustment that are available. The eccentric 109 and disc 110 may be placed in a relative position in which the center of the ring 108 is coincident with the axis of the shaft 93 so that the connecting rod 107 will not reciprocate upon rotation of the shaft 93 and the shaft 78 will not be driven. Thus, the agitator 77 is effectively "switched off." When a relative adjustment of the eccentric 109 and disc 110 is to be made, the fork 120 is placed in the position shown in FIGURE 12 of the drawings and is turned in the direction 123 shown in that figure about the fulcrum afforded by the holder 119. The locking pin 111 is thus moved to the left in FIGURE 12 against the action of the spring 115 and is withdrawn from one of the holes 116. The relative adjustment can then be made manually and, when the newly selected hole 116 is in alignment with the pin 111, the handle 121 is released to enable the spring 115 to urge the pin 111 into said hole. It will be noted that the locking mechanism which includes the pin 111 is partially surrounded by a screening hood 122 formed with a hole through which the handle 121 projects upwardly when the fork 120 is in use. The driving mechanism for the shaft 78 which has been described with reference to FIGURES 11 and 12 of the drawings is of a strong and simple construction but is nevertheless readily adjustable in such a way that the shaft 78 can be driven at different speeds for a constant speed of rotation of the shaft 93. It will be noted that, when the implement is in use, the fork 120 is removed from the position shown in FIGURE 12 and is stored with, for example, the tool kit of the implement.

Figures 13, 14:
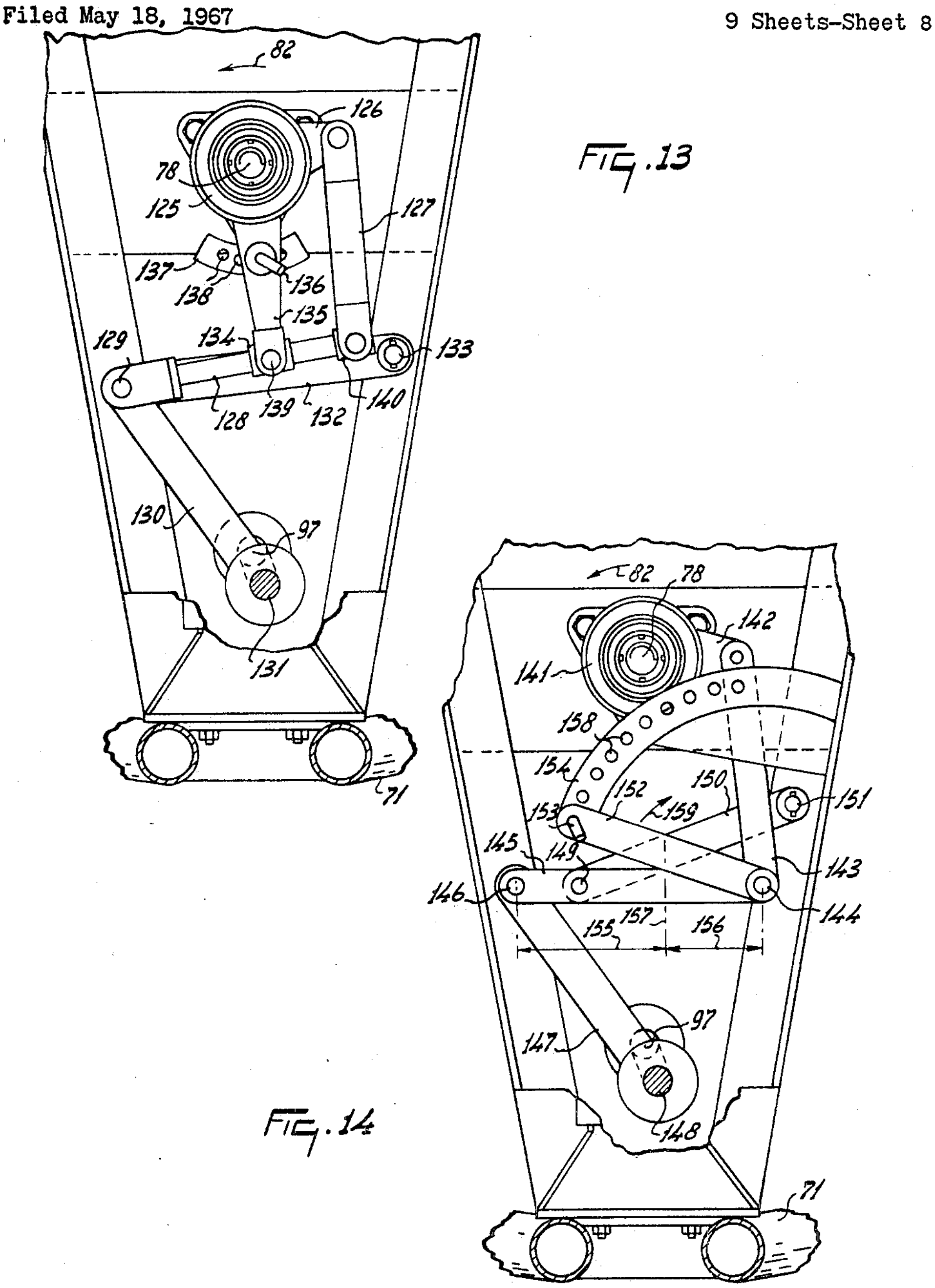

FIGURE 13 illustrates another alternative construction for the driving mechanism to the shaft 78. In this embodiment, the shaft 78 carries a one-way mechanism 125 whose outer driving member has a projecting arm or lug 126. The free end of the arm 126 is pivotally connected to the upper end of a rod 127 whose lower end, in turn, is pivoted to a lever 128. The opposite end of the lever 128 is connected by a pivot 129 to the upper end of a connecting rod 130 whose lower end is rotatably mounted on a crank 131 which, during use of the implement, rotates about the axis 97 of the input shaft 93. The pivot 129 is also connected to one end of an arm 132, the opposite end of said arm 132 being turnable about a pivot 133 which is fixed in position relative to the frame 71 of the implement. The rod 128 is surrounded intermediate its opposite ends by an axially slidable sleeve 134 provided with trunnion pins 139 by which it is pivotally connected to a fork mounted at the lowermost end of a supporting arm 135. The opposite and upper end of the supporting arm 135 is turnable about the shaft 78 with the aid of a bearing which is not visible in the drawings. As can be seen in FIGURE 13 of the drawings, the supporting arm 135 can be retained in different angular settings about the axis of the shaft 78 with the aid of a locking pin 136 which it carries and which can be engaged in any one of a number of holes 138 formed in an arcuate strip 137 which occupies a fixed position relative to the frame 71.

Upon rotation of the input shaft 93, the connecting rod 130 will be caused to reciprocate and this reciprocation will be translated into oscillatory movement of the pivot 129 in an arc of a circle centered upon the fixed pivot 133. This movement of the pivot 129 is transmitted to the lever 128 which oscillates about the trunnion pins 139 that afford its fulcrum. It will be noted that the lever 128 will reciprocate axially in the sleeve 134 to some extent during oscillation about the trunnion pins 139. The oscillatory motion of the lever 128 will cause a similar motion of the driving member of the one-way mechanism 125 by way of the rod 127 and this oscillatory motion will be translated into uni-directional rotation of the shaft 78 in the direction 82 by the mechanism 125.

In order to change the amplitude of angular displacement of the shaft 78 in the direction 82 as a result of a single rotation of the input shaft 93, the locking pin 136 must be withdrawn and the supporting arm 135 turned about the axis of the shaft 78 to a new setting to change the position of the fulcrum of the lever 128. The new setting of the supporting arm 135 is, of course, maintained by entering the locking pin 136 in the appropriate hole 138. When the sleeve 134 is closest to the pivot 129, the speed of rotation of the shaft 78 will be a maximum and, when it is closest to the end 140 of the lever, the speed of rotation will be a minimum. In this embodiment, the required adjustment can be effected easily without it being necessary to alter the throw of the crank 131.

In the embodiment of FIGURE 14 of the drawings, the outer driving member of a one-way mechanism 141 carries a projecting arm or lug 142 whose free end is pivotally connected to the uppermost end of a rod 143. The lowermost end of a rod 143 is connected by a pivot 144 to the ends of rods 145 and 152. The end of the rod 145 which is remote from the pivot 144 is coupled by a further pivot 146 to the upper end of a connecting rod 147. The lower end of the connecting rod 147 is rotatably mounted on a crank 148 which, during use of the implement, rotates about the axis 97 of the input shaft 93. The rod 145 is also connected, at a point along its length, to a further rod 150 by a further pivot 149. The end of the rod 150 remote from the pivot 149 is turnable about a pivot 151 which occupies a fixed position relative to the frame 71 of the implement. The pivots 144, 146 and 149 are not fixed in position. The second arm 152 that is connected to the pivot 144 carries a locking pin 153 at the end remote from said pivot, this locking pin 153 being arranged to co-operate with any one of a number of holes 158 formed in a fixed arcuate strip 154 whose center of curvature more or less coincides with the position of the pivot 144.

Rotation of the input shaft 93 about its axis 97 causes reciprocatory motion of the connecting rod 147 and this, in turn, causes the rods 143, 145, 150 and 152 to move and the outer driving member of the one-way mechanism 141 to be oscillated about the axis of the shaft 78 upon which said mechanism is mounted. This movement is translated into uni-directional rotation of the shaft 78 in the direction 82 in the manner which has previously been described. The mounting of the rod 145 is such that it will tend to oscillate about a point which will move upwardly and downwardly along a line 157, said line 157 being the locus of the various points at which the rods 150 and 152 cross one another at different times. It will be noted that the position of the line 157 is only correct in respect of the illustrated position of the rod 152.

The distances 155 and 156 which are illustrated in FIGURE 14 are the perpendicular distances between the line 157 and the pivot 146 and pivot 144 respectively. The ratio between these distances 155 and 156 determines the extent of reciprocation of the rod 143 during rotation of the input shaft 93. The throw of the crank 148 is non-adjustable and the necessary variation is achieved by withdrawing the locking pin 153 and turning the rod 152 about the pivot 144 in the direction indicated by the arrow 159 in FIGURE 14 or, when appropriate, in a relatively opposite direction. If desired, the rod 152 can be displaced so far in the direction 159 that the line 157 closely approaches the pivot 144. There will then be very little, if any, reciprocation of the rod 143 upon rotation of the input shaft 93, so that, in effect, the agitator 77 will be "switched off." If desired, the arcuate strip 154 can be lengthened to provide further holes 158 and thus a greater degree of adjustment. Instead of using the locking pin 153, a long arm accessible to the driver of the towing tractor or other vehicle may be provided so that an adjustment may be made without the driver needing to dismount from his vehicle.

Figure 15:
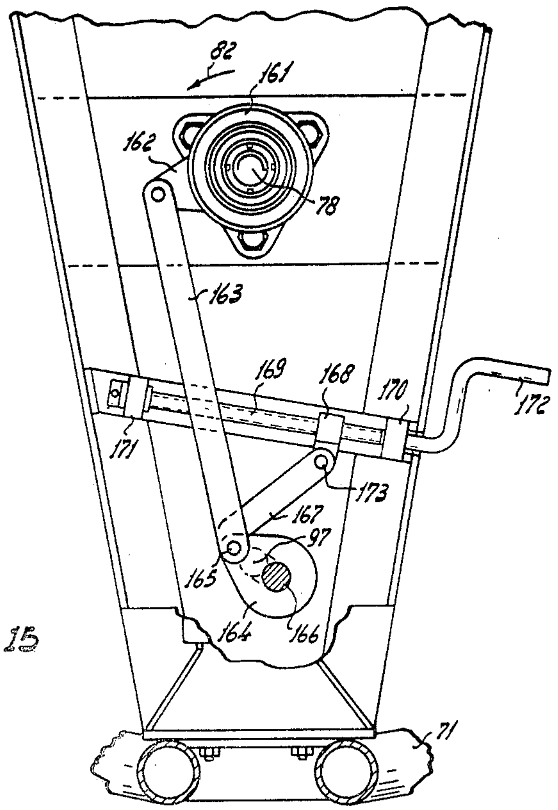

In the embodiment illustrated in FIGURE 15 of the drawings, the shaft 78 is provided with a one-way mechanism 161 the outer driving member of which carries a projecting arm or lug 162 whose free end is pivotally coupled to the upper end of a connecting rod 163. The lowermost end of the rod 163 is pivotally connected by a pin 165 to an eccentric 164 rotatably mounted on a crank 166 which is itself rotatable about the axis 97 of the input shaft 93 during use of the implement. The pin 165 is also connected to the lowermost end of an arm 167 whose uppermost end is connected by a pivot pin 173 to a lug carried by a travelling nut 168. The nut 168 is threadedly mounted on a screw spindle 169 arranged in bearings 170 and 171 so as to be rotatable about its longitudinal axis but substantially axially immovable. The end of the spindle 159 which is closest to the bearing 170 carries a manually operable crank 172.

Upon rotation of the input shaft 93, the pin 165 will oscillate along an arc of a circle centered upon the axis of the pivot pin 173, the connecting rod 163 reciprocating and causing oscillatory motion of the outer driving member of the one-way mechanism 161.

It will be apparent that, as in the preceding embodiments, the one-way mechanism 161 translates the oscillatory motion which is transmitted to it into unidirectional rotation in the direction 82 of the agitator 77. It will also be apparent that the extent of the angular displacement of the shaft 78 about its longitudinal axis in response to a single rotation of the input shaft 93 will be varied by rotating the crank 172 so that the nut 168 travels towards one or other end of the spindle 169. When the nut 168 is at the extreme left-hand end of the spindle 169 as seen in FIGURE 15 of the drawings, the pin 173 occupies a similar position and the oscillatory motion of the pin 165 has a very large horizontal component and only a small vertical component. Thus, the speed of rotation of the shaft 78 will then be a minimum. When the nut 168 is located near the center or towards the right-hand end of the spindle 169, the oscillatory motion of the pin 165 will have a large vertical component and only a very small horizontal one so that the speed of rotation of the shaft 78 will then be much greater. This construction affords an infinitely variable adjustment of the speed of rotation of the shaft 78 and is such that said adjustment can be made while the implement is operating. If it is desired that the adjustment should be capable of being made from the tractor or other towing vehicle, then the spindle 169 may be arranged to be rotated by, for example, mechanism similar to one of the mechanisms described with reference to FIGURES 1 to 6 of the drawings.

The various embodiments which have been described are of strong and durable construction and afford a number of different ways in which the effective speed of an agitator or combined agitator and conveyor can be varied for a constant speed of a rotary input shaft of the implement. It is often important to be able to change the speed of rotation of the agitator or agitator/conveyor while the spreading implement is in uninterrupted operation and several of the embodiments which have been described enable this to be done.

What we claim is:

1. A spreading implement having an agitator and a rotary shaft, a driving mechanism connecting said shaft with said agitator, said mechanism comprising eccentric means coupled with said rotary shaft and a plurality of interconnected rods coupling said shaft to said agitator, the connection of at least one of said rods within said mechanism being adjustable to vary its driving length and consequently the extent of the movement of said agitator responsive to a revolution of said rotary shaft.

2. The implement of claim 1, wherein said spreading implement includes a hopper with an outlet and an input shaft is connected to a rotatable spreader positioned beneath said outlet, said input shaft being in driving connection with said eccentric means.

3. An implement as claimed in claim 1, wherein said driving mechanism includes a one-way device interposed between said rods and said agitator.

4. An implement as claimed in claim 3, wherein said agitator has a stub shaft which projects from said implement, said one-day device being mounted on the outwardly projecting portion of said stub shaft.

5. An implement as claimed in claim 1, wherein said agitator includes a screw-portion wound around the longitudinal axis of said agitator.

6. An implement as claimed in claim 5, wherein said screw-portion of said agitator is of rectangular cross-section, and said portion is wound around the axis of said agitator with its broader sides extending substantially radially relative to said axis.

7. An implement as claimed in claim 1, wherein a one-way device is included in said driving mechanism and said eccentric is coupled to a connecting rod which is pivotally coupled to an arm connected to a driving member of said one-way device.

8. An implement as claimed in claim 7, wherein said driving member of the one-way device has a projecting arm to which a rod can be connected in any one of at least two different relative positions.

9. An implement as claimed in claim 1, wherein said agitator has a central shaft to which two one-way devices are connected and said driving mechanism includes two eccentrics that are 180° removed from one another about their common axis of rotation, each eccentric being coupled to a corresponding one of the one-way devices by at least one lever.

10. An implement as claimed in claim 9, wherein the input member of at least one of said two one-way devices is displaceable from one side of a vertical plane containing the axis of rotation of said agitator to the opposite side thereof, the corresponding lever being connectable to said input member in either of said positions.

11. An implement as claimed in claim 1, wherein the eccentricity of said eccentric means is adjustable.

12. An implement as claimed in claim 11, wherein said eccentric means includes an adjustable eccentric having two relatively displaceable rings arranged eccentrically around said rotary shaft whereby its effective eccentricity can be changed by relative displacement of said rings.

13. An implement as claimed in claim 12, wherein retaining means is provided for retaining said rings in chosen settings relative to one another, said retaining means including a spring-loaded pin connected to said rotary shaft.

14. An implement as claimed in claim 13, wherein said retaining means includes a holder upon which an adjusting arm can be detachably arranged.

15. An implement as claimed in claim 1, wherein a one-way device is included in said driving mechanism and said driving mechanism comprises a single lever turnable about a pivot fixedly mounted on the frame of said implement, said single lever being interposed between a rod connected to an input member of said one-way device and a second rod connected to said eccentric means.

16. An implement as claimed in claim 1, wherein said eccentric means is coupled to a connecting rod and said connecting rod is pivotally coupled to two further rods, one of said further rods being turnable about a pivot occupying a fixed position with respect to the frame of said implement and the other being coupled to an input arm of a one-way device in said driving mechanism, said last-mentioned further rod carrying an axially displaceable sleeve which is pivotally conected to a supporting arm turnably mounted on the frame, and positioning means to retain it in any one of a number of different positions about the axis of its connection with said implement.

17. An implement as claimed in claim 16, wherein the axis about which said supporting arm is turnable is coincident with the axis of rotation of the agitator.

18. An implement as claimed in claim 1, wherein said driving mechanism includes a one-way device having a projecting arm and the eccentric means has a connecting rod coupled to said arm, two relatively pivotable rods being interposed between said arm and said connecting rod whereby a pivotal connection links said arm and said coupling rod to rod means which is displaceably connected to said implement, said rod means being provided with locking means for retaining same in any chosen one of a number of different positions relative to said implement, one of said two pivotally interconnected rods being also connected to a still further rod pivotally coupled to said implement.

19. An implement as claimed in claim 18, wherein said still further rod is pivotally connected to one of said pivotable rods directly linked to said connecting rod at a point located between the pivotal connection to said connecting rod and the pivotal connection to the other of said two pivotally interconnected rods.

20. An implement as claimed in claim 1, wherein said driving mechanism includes a one-way device and said driving mechanism includes an eccentric disc mounted on a crank arranged to be driven by said rotary shaft, said eccentric disc having a connecting link pivoted to it which connecting link is also pivoted to an input rod of said one-way device, an additional rod being engageable with the pivot linking said connecting link and said eccentric disc, said additional rod being pivotally connected to a supporting member that is displaceable along a guide to any one of a number of different positions.

21. An implement as claimed in claim 20, wherein said supporting member is a nut axially displaceable along a screw-threaded spindle, said spindle being rotatably journalled in the frame of said implement so as to be substantially immovable in an axial direction.

22. An implement as claimed in claim 21, wherein said spindle is rotatable by a control member which is accessible from the driving seat of an agricultural tractor towing said implement.

23. An implement as claimed in claim 1, wherein at least two control members are interconnected to said rotary shaft which enable various operative parts of the implement to be placed in different operating positions, said control members being accessible from the driving seat of an agricultural tractor towing said implement.

24. A spreading implement having an agitator and a rotary shaft, a driving mechanism connecting said shaft with said agitator, said mechanism comprising eccentric means coupled with said rotary shaft and a plurality of interconnected rods, said driving mechanism including cranks with ends spaced 180° apart from one another and a rod connected to each of said ends, arms in driving connection with said agitator, each of said rods being connectable to one of said arms whereby said agitator is turned by the revolutions of said rotary shaft.

25. The implement of claim 24, wherein one of said cranks is part of an input shaft, and said input shaft is operatively associated with a rotatable spreading member positioned beneath an outlet of said implement.

26. A spreading implement having a hopper and a turnable agitator in said hopper for delivering material through an outlet in said hopper, a rotary shaft connected to said agitator through a driving mechanism, said driving mechanism comprising eccentric means coupled with a plurality of interconnected rods, the connection between two of said rods being adjustable over the length of a first of said rods whereby the extent of turning of said agitator responsive to a revolution of said rotary shaft can be varied.

27. A spreading implement having a hopper and a turnable agitator in said hopper, said agitator being driven by a rotary shaft through a driving mechanism, said mechanism including eccentric means coupled with said rotary shaft and said eccentric means being connected to a plurality of interconnected rods which are in driving association with said agitator, an intermediate rod of said interconnected rods being positioned to move about a pivot with a substantially horizontal axis, one end of said intermediate rod being connected to said eccentric means through a further rod and the other end being connected to said agitator through a third rod, the position of said intermediate rod being shiftable relative to said further rod and said third rod whereby the extent of turning of said agitator responsive to a revolution of said rotary shaft can be varied.

References Cited

UNITED STATES PATENTS

| | | | |
|---|---|---|---|
| 1,054,509 | 2/1913 | Craggs | 259—127 |
| 2,644,677 | 7/1953 | Simon | 259—101 |
| 3,085,789 | 4/1963 | Heider | 259—97 |

ROBERT W. JENKINS, Primary Examiner